United States Patent
Narayana et al.

[19]

[11] Patent Number: 5,860,160
[45] Date of Patent: Jan. 12, 1999

[54] HIGH SPEED FIFO MARK AND RETRANSMIT SCHEME USING LATCHES AND PRECHARGE

[75] Inventors: Pidugu L. Narayana; Daniel Eric Cress; Andrew L. Hawkins; Ping Wu, all of Starkville, Miss.

[73] Assignee: Cypress Semiconductor Corp., San Jose, Calif.

[21] Appl. No.: 768,407

[22] Filed: Dec. 18, 1996

[51] Int. Cl.[6] ................................................ G06F 12/00
[52] U.S. Cl. ................................ 711/109; 365/189.12
[58] Field of Search ................................. 365/203, 221, 365/230; 711/131, 109

[56] References Cited

U.S. PATENT DOCUMENTS

| | | | |
|---|---|---|---|
| 4,467,443 | 8/1984 | Shima | 364/900 |
| 4,802,122 | 1/1989 | Auvinen et al. | 365/154 |
| 4,839,866 | 6/1989 | Ward et al. | 365/221 |
| 4,864,543 | 9/1989 | Ward et al. | 365/221 |
| 4,875,196 | 10/1989 | Spaderna | 365/238 |
| 4,891,788 | 1/1990 | Kreifels | 365/49 |
| 4,985,867 | 1/1991 | Ishii et al. | 365/221 |
| 5,084,837 | 1/1992 | Matsumoto et al. | 395/250 |
| 5,088,061 | 2/1992 | Golnabi et al. | 365/189.01 |
| 5,220,529 | 6/1993 | Kohiyama et al. | 365/189.01 |
| 5,222,047 | 6/1993 | Matsuda et al. | 365/230.03 |
| 5,228,002 | 7/1993 | Huang | 365/221 |
| 5,262,996 | 11/1993 | Shiue | 365/221 |
| 5,265,063 | 11/1993 | Kogure | 365/233 |
| 5,291,453 | 3/1994 | Aota et al. | 365/221 |
| 5,305,253 | 4/1994 | Ward | 365/73 |
| 5,311,475 | 5/1994 | Huang | 365/221 |
| 5,317,756 | 5/1994 | Komatsu et al. | 395/800 |
| 5,325,487 | 6/1994 | Au et al. | 711/131 |
| 5,345,419 | 9/1994 | Fenstermaker et al. | 365/189.04 |
| 5,365,485 | 11/1994 | Ward et al. | 365/221 |
| 5,367,486 | 11/1994 | Mori et al. | 365/189.05 |
| 5,375,092 | 12/1994 | Taniguchi et al. | 365/221 |
| 5,404,327 | 4/1995 | Houston | 365/203 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,412,611 | 5/1995 | Hattori et al. | 365/221 |
| 5,426,612 | 6/1995 | Ichige et al. | 365/220 |
| 5,467,319 | 11/1995 | Nusinov et al. | 365/231 |
| 5,490,257 | 2/1996 | Hoberman et al. | 395/427 |
| 5,506,809 | 4/1996 | Csoppensky et al. | 365/221 |
| 5,506,815 | 4/1996 | Hsieh et al. | 365/230.03 |
| 5,513,318 | 4/1996 | van de Goor et al. | 395/185.01 |
| 5,521,876 | 5/1996 | Hattori et al. | 365/221 |
| 5,528,553 | 6/1996 | Saxena | 365/230.01 |
| 5,546,347 | 8/1996 | Ko et al. | 365/221 |
| 5,673,234 | 9/1997 | Hawkins et al. | 365/239 |

FOREIGN PATENT DOCUMENTS

| | | |
|---|---|---|
| 0113996 | 8/1989 | Japan . |
| 0676559 | 6/1994 | Japan . |

*Primary Examiner*—Tod R. Swann
*Assistant Examiner*—David Langjahr
*Attorney, Agent, or Firm*—Maiorana & Acosta, P.C.; Christopher P. Maiorana

[57] ABSTRACT

The present invention provides a look ahead architecture to satisfy the retransmit recovery time constraints in a mark and retransmit system while allowing a full bitline precharge. A number of sense amplifiers are provided in the look ahead architecture that may be equipped with a "shadow latch" to store the read data when the mark pointer is asserted. As a result, the data to be retransmitted will be retrieved from the shadow latches when the retransmit is asserted, allowing a full precharge cycle before reading from the memory array.

20 Claims, 5 Drawing Sheets

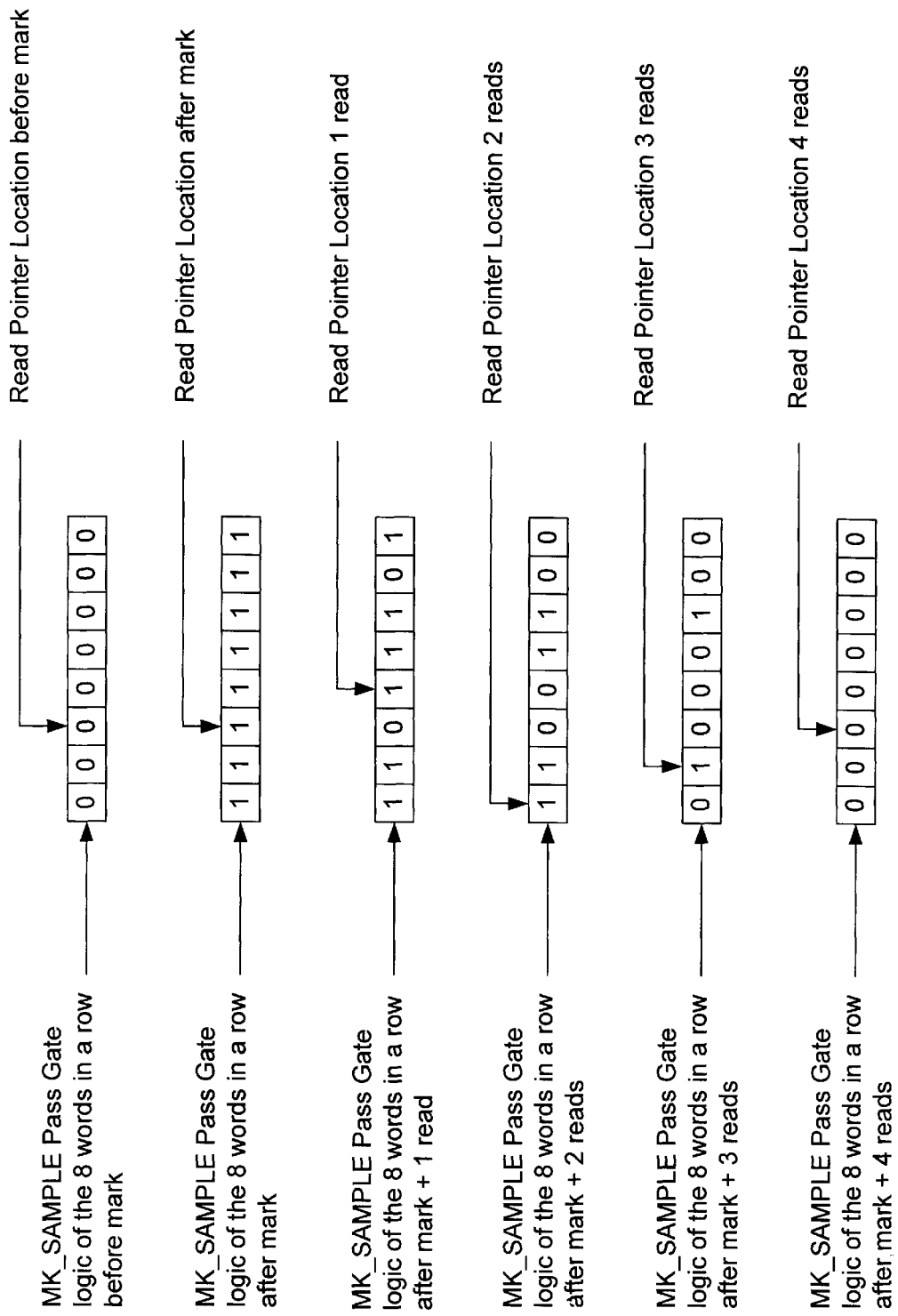

HIGH SPEED FIFO MARK AND RETRANSMIT SCHEME USING LATCHES AND PRECHARGE

FIELD OF THE INVENTION

The present invention relates to FIFOs generally, and more particularly, to a high speed FIFO mark and retransmit method and apparatus.

BACKGROUND OF THE INVENTION

First-in First-out (FIFO) buffers may use mark and retransmit schemes to allow a user to return to a location in the FIFO and read data that was previously "marked" during the read cycle. When a mark pointer is asserted, the current value of the read pointer is stored for a subsequent retransmit. When a retransmit is asserted, the read pointer is updated with the mark pointer which indicates a location in the FIFO where the retransmit is to begin. For proper operation of the FIFO, the write pointer should not pass the mark pointer. Previous approaches implementing mark and retransmit schemes require the operator of the FIFO to ensure that the write pointer does not pass the mark pointer.

Certain known constraints hinder the ability of the retransmit function to have a quick recovery time. Look ahead architectures may be implemented in high performance FIFOs to allow the read pointer to look ahead of its current location so that the information may be accessed faster during a read from the FIFO. A mark and retransmit scheme may interrupt the look ahead architecture due to precharging requirements of the bitlines. Data corruption due to charge sharing on the bitlines may occur without the proper precharge time. To avoid data corruption due to charge sharing, the bitlines of the FIFO should be precharged before the read wordlines are asserted. Another known constraint is that the mark pointer may be set at any word in the FIFO. The FIFO must then initiate a bitline precharged cycle upon the assertion of a retransmit. The more words in the memory array, the longer the precharge cycle time. For large memory arrays, the long precharge cycle creates an unacceptably long retransmit recovery time.

Referring to FIG. 1, a circuit 10 is shown illustrating a previous approach mark and retransmit system implemented with registers to store data for retransmit. The circuit 10 generally comprises a write in register 12, a retransmit lower register 14, a retransmit upper register 16, a holding register 18, a read out register 20 and a read hold register 22. A write data signal is received at an input 24 of the write in register 12. The write data signal is also presented to a bus 26. The bus 26 presents an output 28 representing the read data. The write in register 12 has an output 30 that presents a signal to a bus 32 as well as to an input 34 of the write hold register 18. The bus 32 generally presents a signal to the bus 26. The register 14 is connected through a bus 36 to the bus 32. Similarly, the registers 16 are connected through a bus 38 to the bus 32. The write hold register 18 has an output 40 that presents a signal to the bus 32. The read out register 20 presents a signal on an output 42 to the bus 32. The read out register 20 has an input 44 that receives a signal from the read hold register 22. The read hold register 22 has an input 46 that receives a signal from the memory array. The write hold register 18 also has an output 48 that presents a signal to the memory array. The retransmit lower register 14 and the retransmit upper register 16 begin storing the information when a mark signal is asserted. After a retransmit, data is read from the registers 14 and 16. However, the bitlines must first be precharged before reading, which may interrupt the look ahead architecture. While the registers accommodate the precharge, they generally require complex logic and consume a large amount of area on the chip.

The write in register 12, the retransmit lower register 14, the retransmit upper register 16, the write hold register 18, the read out register 20 and the read hold register 22 are shown generally implemented as 32-bit registers. While the circuit 10 may provide the appropriate mark and retransmit scheme, it becomes cumbersome to create such numerous wide bit registers.

SUMMARY OF THE INVENTION

The present invention provides a look ahead architecture to satisfy the retransmit recovery time constraints in a mark and retransmit system while allowing a full bitline precharge. A number of sense amplifiers are provided in the look ahead architecture that may be equipped with a "shadow latch" to store the read data when the mark signal is asserted. The data to be retransmitted will be retrieved from the shadow latches when the retransmit is asserted, allowing a full precharge cycle before reading from the memory array.

The objects, features and advantages of the present invention include providing a look ahead architecture for use in a mark and retransmit system that provides a fast retransmit recovery time without interfering with a full bitline precharge. The present invention allows a full pre-charge cycle before reading from the memory array, requires less area to be implemented, provides a simple design, does not interrupt any look ahead architectures that may be implemented and meets recovery time specifications even for large memory arrays.

BRIEF DESCRIPTION OF THE DRAWINGS

These and other objects, features and advantages of the present invention will be apparent from the following detailed description and the appended claims and drawings in which:

FIG. 5 is a diagram of the execution of the mark and retransmit logic.

DETAILED DESCRIPTION OF THE PREFERRED EMBODIMENTS

Figure 1:
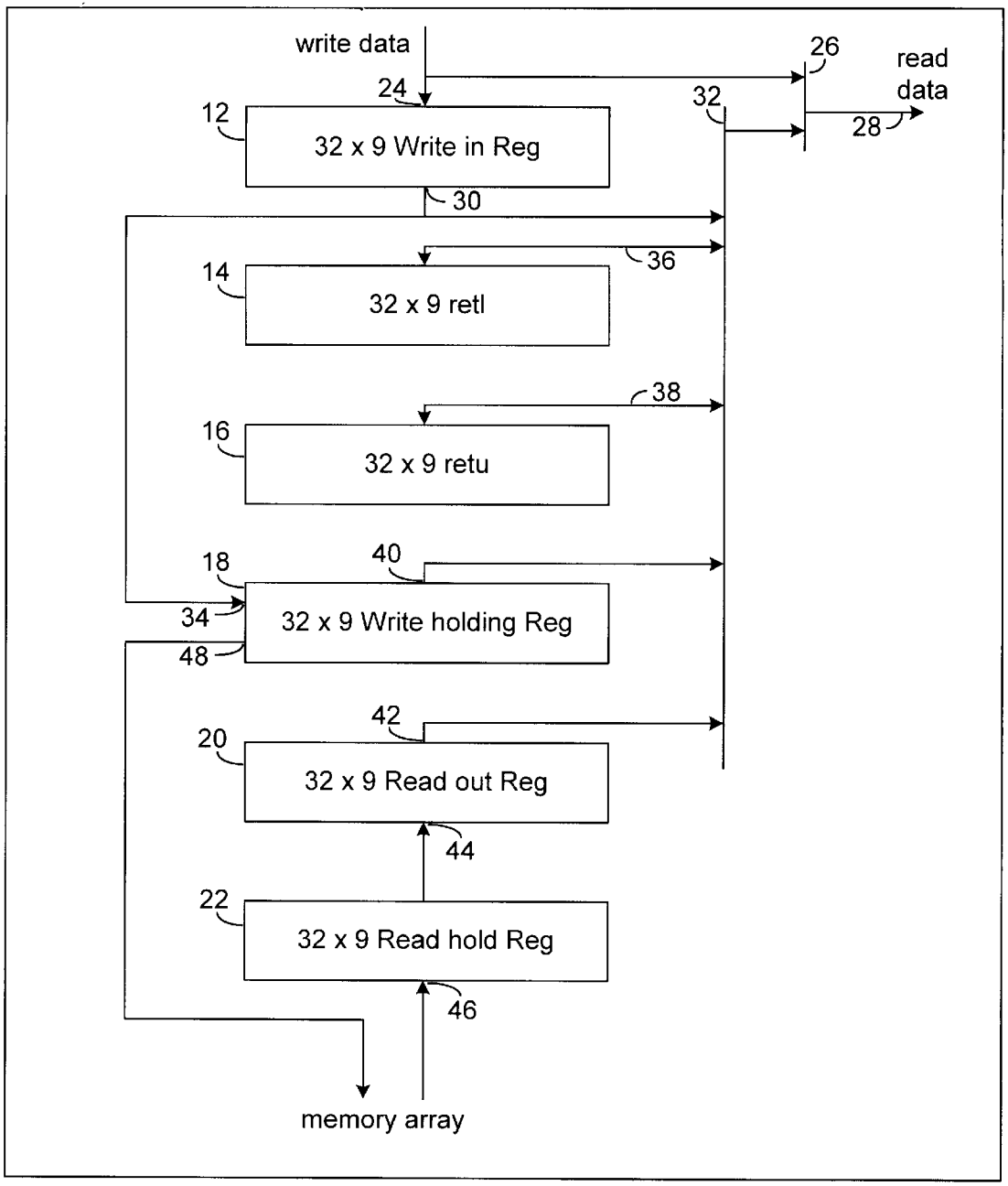
FIG. 1 is a block diagram of a previous approach for implementing a mark and retransmit function implemented with registers to store data for retransmit.
Figure 2:
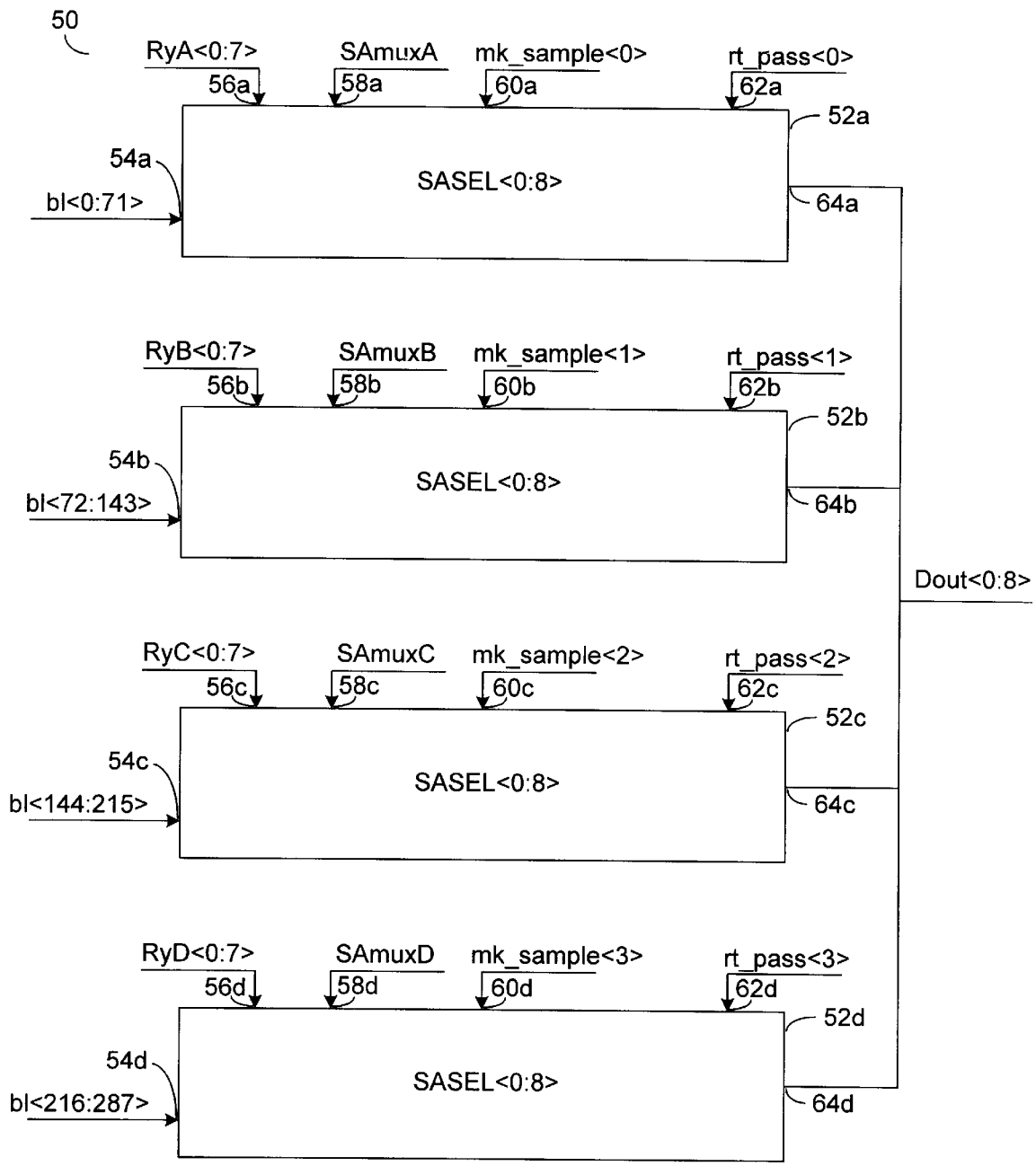
FIG. 2 is a block diagram of the data path of the look ahead architecture according to a preferred embodiment of the present invention.

Referring to FIG. 2, a block diagram of a circuit 50 implementing a look ahead architecture according to a preferred embodiment of the present invention is shown. The circuit 50 generally comprises a number of blocks 52a, 52b, 52c and 52n. The block 52a is shown generally having an input 54a that may receive a signal BL, an input 56a that may receive a signal RyA, an input 58a that may receive a signal SAmuxA, an input 60a that may receive a signal MK_SAMPLE0 and an input 62a that may receive a signal RT_PASS0. The signal BL generally represents a number of bitlines from the memory array (not shown). The signal RY generally represents a Y (or column) select signal. The block 52a generally presents an output 64a that represents a data out signal for the block 52a. The blocks 52b, 52c and 52n have similar inputs and outputs. For example, the block 52b has an input 54b, 56b, 58b, 60b and 62b as well as an output 64b. The output 64a, 64b, 64c and 64d may be combined to present an output signal Dout<0:8>, which represents the data output of the circuit 50. When a mark pointer is asserted, the current value of the read pointer is stored for subsequent retransmit. When a retransmit is asserted, the read pointer is updated with the mark pointer which indicates a location where a retransmit is to begin.

Figure 3:
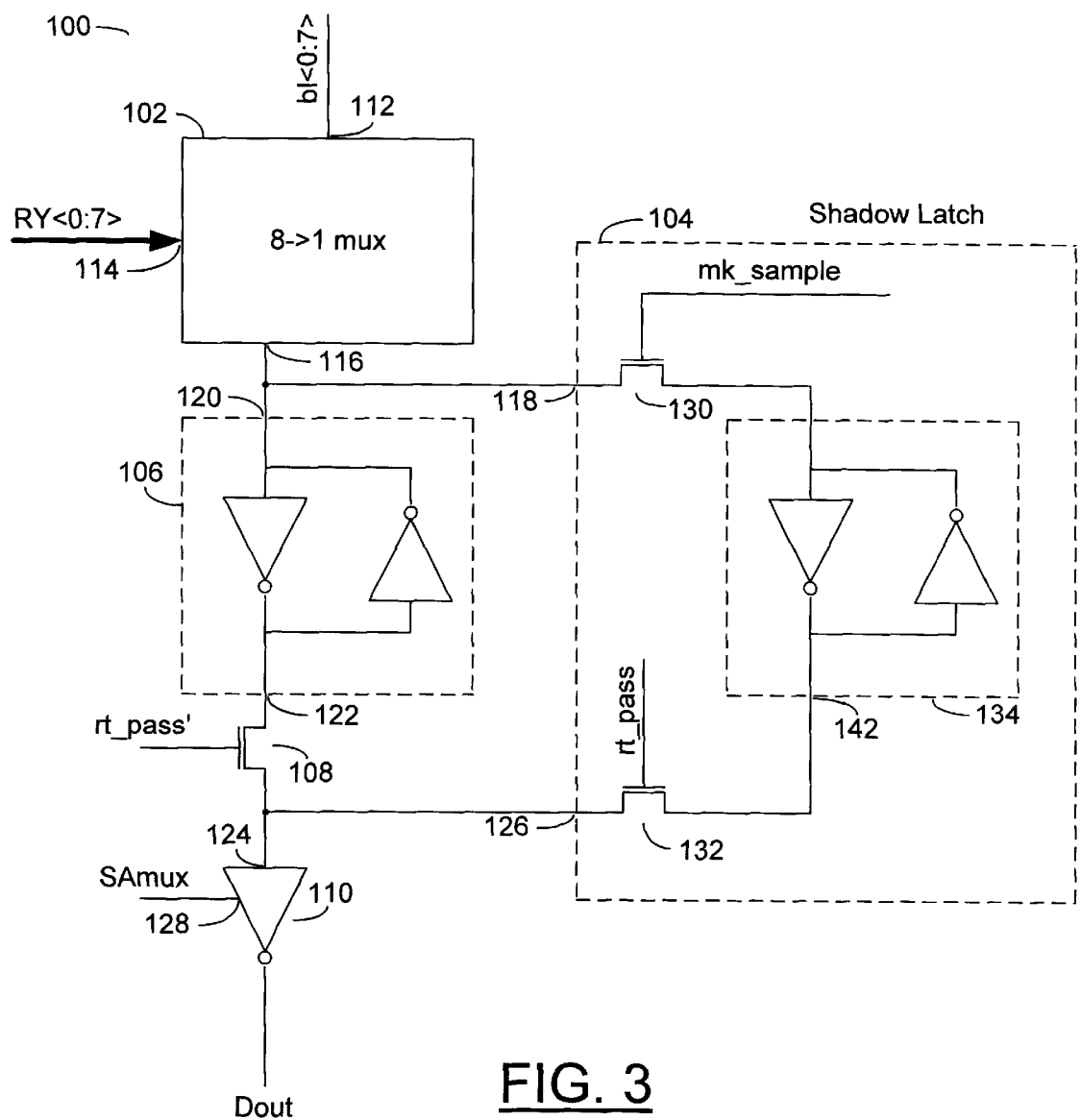
FIG. 3 is a block diagram of a particular data path of the architecture of FIG. 2.

Referring to FIG. 3, a circuit 100 is shown representing a particular data path. The circuit 100 generally stores a single bit of information. To implement the storing of eight words that are 9-bits wide, a total of 72 circuits 100 may be implemented as part of the circuit 50. The number of circuits 100 implemented may be adjusted in response to the number of words and the data width of the words implemented to store data during the precharge. The circuit 100 generally comprises a multiplexer 102, a shadow latch 104, a latch 106, a pass gate 108 and a sense amplifier 110. The multiplexer 102 may receive a signal BL at an input 112, a signal RY at an input 114, and may present a signal at an output 116. The signal BL generally represents a number of bitlines from the memory array. The input 114 generally corresponds to the input 56a~56d of FIG. 2. The output 116 of the multiplexer 102 is generally presented to an input 118 of the shadow latch 104 as well as to an input 120 of the latch 106. An output 122 of the latch 106 is generally presented to a first side of the pass gate 108. The second side of the pass gate 108 is generally presented to an input 124 of the sense amplifier 110. An output 126 of the shadow latch 104 is also presented to an input 124 of the sense amplifier 110. The sense amplifier 110 presents an output signal Dout that represents a single bit of the output signal Dout<0:8> of FIG. 2. The sense amplifier 110 generally operates as a tri-state inverter and has a control input 128 that generally controls the switching of the output Dout that generally corresponds to 58a~58d of FIG. 2.

The shadow latch 104 generally comprises a pass gate 130, a pass gate 132 and a latch 134. The pass gate 130 has a gate that generally receives the signal MK_SAMPLE that generally corresponds to signals 60a~60d of FIG. 2. The input 118 is generally presented to a first side of the pass gate 130, while a second side of the pass gate 130 is generally presented to an input 140 of the latch 134. An output 142 of the latch 134 is generally presented to a first side of the pass gate 132. A second side of the pass gate 132 is generally presented as the output 126. The gate of the pass gate 132 generally receives the signal RT_PASS which generally corresponds to signals 62a~62d of FIG. 2.

Figure 4:
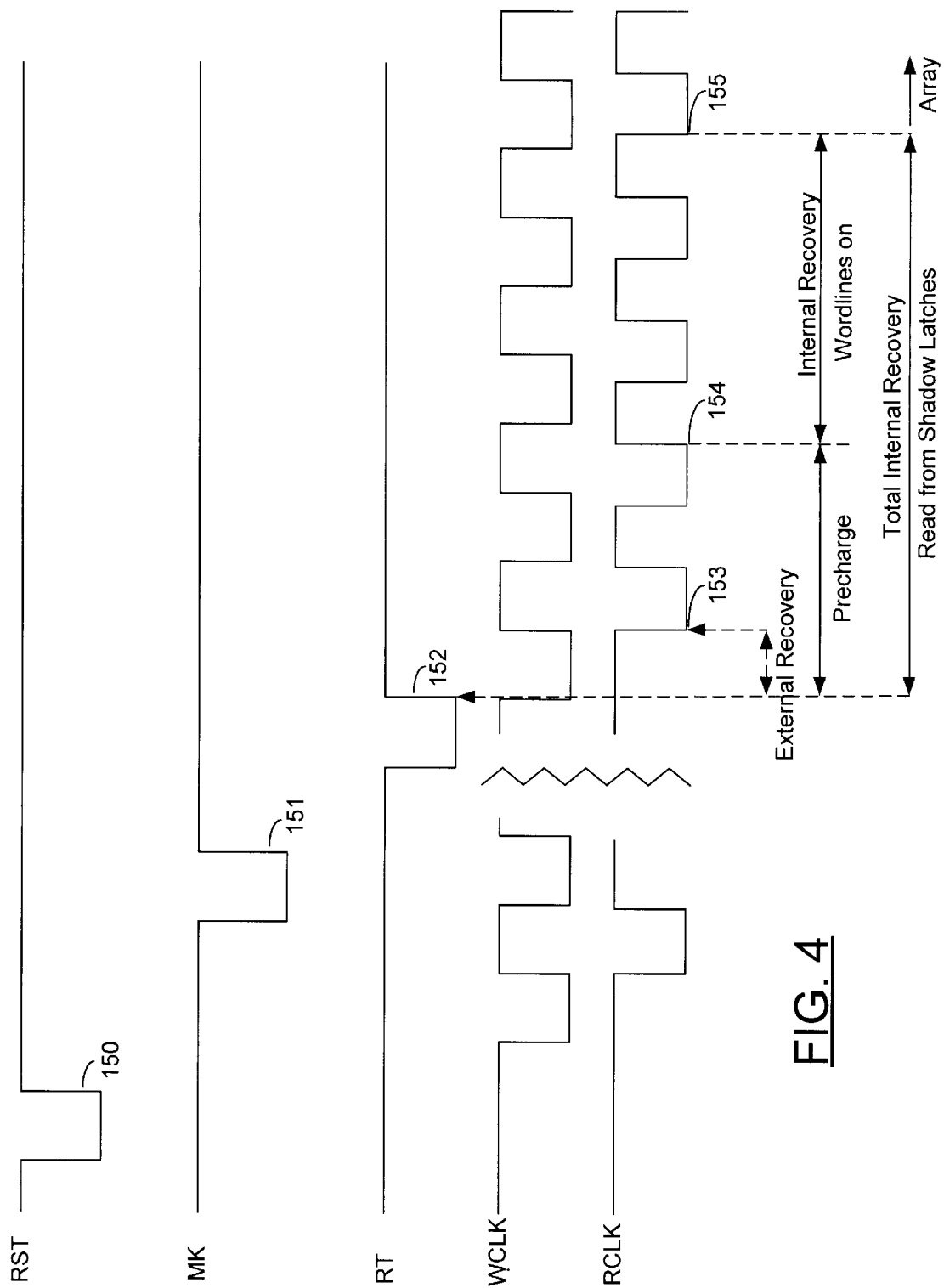
FIG. 4 is a graphical representation of an implementation of the present invention having a 4-cycle look ahead architecture.

Referring to FIG. 4, a timing diagram of the various signals is shown. The reset signal RST is shown having a low pulse 150. Similarly, the retransmit signal RT is shown having a low pulse 152. The write clock signal WCLK is shown generally as a 50% duty cycle clock. The read clock signal RCLK is also shown generally as a 50% duty cycle clock.

A low pulse 150 of the reset signal RST generally resets the circuit 50. The low pulse 152 of the retransmit signal RT may indicate when a particular retransmit may be initiated. A low pulse 154 of the signal RCLK indicates when the wordlines are turned on and the bitlines begin charging with data after a precharge has occurred. The distance between the low pulse 152 and the low pulse 154 generally indicates the external recover time necessary for proper precharging of the bitlines as seen outside the memory array. The time between the low pulse 154 and the low pulse 155 generally indicates the internal recovery time when the bitlines are completely charged with valid data and the output data is read from the memory. The external recovery time and the internal recovery time combine to indicate the total internal recovery time for proper precharging of the bitline.

At the low pulse 155 the data is no longer read from the shadow latches 104, but from the array. From the time indicated by the low pulse 153 to time indicated by the low pulse 155 (4 cycles in the case shown in FIG. 4) the output data is generally read from the shadow latches 104 of FIG. 3. FIG. 4 generally illustrates a 4-word look ahead architecture. A greater number of look ahead cycles may be implemented according to the design criteria of a particular application. The particular amount of time for the precharging of the bitlines is a function of, among other things, the depth of the memory array in which the architecture 50 is implemented. During the time it takes to precharge the bitlines, the data received at the output DOUT is generally presented by the shadow latches 104 at output 126. At such time, the signal rt-pass is asserted and the signal rt-pass' is not asserted. The shadow latches 104 may be implemented as a cache cell that does not generally require precharging.

In an architecture where a 4-cycle total internal recovery is necessary, four words will generally be written to a number of shadow latches 104. After the initial four words are written to the shadow latches 104, the data may be read, during a retransmit, from the sense amplifier 110. In such an arrangement, an initial number of bits are stored in the shadow latches 104, which generally do not have the precharge limitations associated with the bitlines of the memory array. As a result, after a retransmit is initiated, the initial bits are read from the shadow latches 104 during the precharge and internal recovery time, after which the bits are again read from the multiplexers 102.

The logic for the signal MK_SAMPLE is generally presented to the gate of the device 130 and may control the storage of data when the mark is asserted. The signal MK_SAMPLE may be described generally as:

always @(negedge MARK)
    Turn On all the MK_SAMPLE pass gates
always @(posedge MARK) begin
    if (WREQ == NOT ACTIVE)
        Shut off all the MK_SAMPLE pass gates on the rising edge of MARK else
        Sequentially shut off each of the MK_SAMPLE gates
end The logic of the signal MK_SAMPLE accounts for various states of the read pointer and write pointer. Various status flags may be implemented in a FIFO memory indicating various states of the FIFO. One such signal is a read/write equality signal WREQ. When the read pointer and the write pointer are equal, the WREQ signal is generally asserted. It is often desirable to have the signal WREQ be asserted when the read pointer is close to the write pointer. It is also desirable to program the number of look ahead cycles between the read pointer and the write pointer that may be present and still have the signal WREQ be asserted. An example of such a programmable signal WREQ may be found in copending application Ser. No. 08/578,209, which is hereby incorporated by reference in its entirety.

If a programmable word line equality signal WREQ is programmed such that the number of look ahead cycles present to initiate the signal WREQ is equal to the number of cycles necessary to precharge the bitline, then the WREQ signal may be used as part of the logic for the signal MK_SAMPLE. In the example where four cycles are necessary to properly precharge the bitlines, the signal WREQ would generally be programmed to be asserted when the read pointer is within four look ahead cycles of the write pointer. Specifically, if the signal WREQ were asserted under such a situation, the first number of bits would be written to the shadow latches 104, then a second number of bits would be written to the shadow latches 104 in sequential order. As the second number of bits finishes writing to the shadow latches 104, the first shadow latch 104 generally finishes sampling and the signal MK_SAMPLE would be unasserted for the pass gate 130. On the reads after the mark signal 151 is asserted, data may be written to the shadow latch 104 and to the data output DOUT simultaneously by flowing through the shadow latch 104. When the length between the read and the write pointers is smaller than the length of the total number of shadow latches 103, the shadow latches 104 will generally turn on all at once (FIG. 5) and turn off the particular latches in a cascaded fashion to avoid overwriting data when the pointer returns.

Once a particular bit is written in the shadow latch 104, the pass gate 130 shuts off the writing for that particular bit. If the pass gate 130 were left on, the data written may be corrupt for that particular cell. When the particular data stored in a particular cell is sampled, the pass gate 130 shuts off the cell where the particular data is stored.

After a mark signal, each of the bits are immediately sampled. After the bits are written an evaluation process generally takes place. Specifically, the signal WREQ is checked to see if the read pointer is too close to the write pointer which may indicate corrupted data. Under such circumstances, the pass gates 130 are kept on and an additional amount of data is presented to the shadow latches 134 as the write pointer increments. This effectively overwrites the potentially corrupted data, while still allowing an initial 8-bits of data to be stored in the shadow latches 134 for a subsequent retransmit.

Referring to FIG. 5, a graphical representation of the operation of the circuit 50 is shown when the signal WREQ is asserted. The graphical representation in FIG. 5 illustrates the implementation of different mark and retransmit locations. The left four bits generally operate in a mirrored fashion to the right four bits. The read pointer may progress through the four bits and then cascade back around to the beginning bit. The first state where the read pointer location occurs before the mark has four zero states. The first state after a mark shows each of the four states being a one with the read pointer location being at the third location. After one read, the third location where the read pointer previously pointed, is generally changed to a zero and the read pointer shifts right one location to the fourth location. In the state after two reads the fourth location generally turns to a zero and the read pointer generally cascades back around to the first location. A similar pattern is generally repeated until each of the locations is set back to a zero. Each of the locations of the read pointer after the previous mark location is generally turned to a zero. Generally, a zero indicates that the shadow latch 104 generally does not sample while a one indicates that the shadow latch 104 does sample. Generally, each of the four bits are sequentially shut-off. Initially, during a mark, all of the samples are turned on. After the particular reads, the mark pass gates MK_SAMPLE are sequentially shut-off. FIG. 5 graphically represents the case when the signal WREQ is asserted.

When the signal WREQ is not asserted, sequential de-activation of the shadow latches 104 may not be required, rather all the latches are deactivated after one read cycle. Since the read and write pointers are far away, the chance of reading false data is minimized. However, a subsequent mark may require an additional analysis of the signal WREQ.

While the invention has been particularly shown and described with reference to the preferred embodiments thereof, it will be understood by those skilled in the art that various changes in form and details may be made without departing from the spirit and scope of the invention.

We claim:

1. A circuit comprising:

a memory having a plurality of locations, a read pointer, and a write pointer;

a mark circuit configured to indicate a first location of said memory;

a first latch circuit configured to store one or more words following said first location; and a select circuit configured to read said one or more words from said first latch circuit in response to a first state of a retransmit signal, wherein said first latch circuit, said mark circuit and said select circuit do not affect data stored in a row, column or block of said memory.

2. The circuit according to claim 1 wherein said first circuit, said mark circuit and said select circuit do not affect a look ahead architecture of said memory.

3. The circuit according to claim 1 further comprising a second latch configured to receive information in response to a second state of said retransmit signal.

4. The circuit according to claim 3 wherein said select circuit reads from either said first or second latch circuit in response to said retransmit signal.

5. The circuit according to claim 1 wherein said first latch circuit comprises one or more memory locations for storing said one or more words during a precharge time.

6. The circuit according to claim 4 wherein said one or more words are read from said first latch during a precharge time of a bitline of said memory.

7. The circuit according to claim 5 wherein said first latch comprises one or more control circuits each configured to limit when one of said words is written to each of said memory locations.

8. The circuit according to claim 7 wherein said one or more words are written to said one or more memory locations in a sequential order.

9. The circuit according to claim 5 wherein said one or more memory locations are written to without waiting for said precharge time.

10. A circuit comprising:

means for storing data in a plurality of locations;

means for indicating one of said locations for which to read or write data;

means for marking a first location of said memory;

means for writing one or more words to a first latch after said marking means marks said first location;

means for writing one or more words to a second latch at a time other than following said location; and means reading said one or more words from said first latch after a retransmit signal is asserted, wherein said means for storing, means for writing and means for reading do not affect a row, column or block of said means for storing.

11. The circuit according to claim 10 further comprising:

select means for reading from either said first or second latch in response to said retransmit signal.

12. The circuit according to claim 10 wherein said first latch circuit comprises one or more memory locations for storing said one or more words.

13. The circuit according to claim 10 wherein said one or more words are read from said latch during a precharge time of a bitline of said memory array.

14. The circuit according to claim 10 wherein said first latch comprises:

one or more control circuits each configured to limit when one of said words is written to each of said memory locations.

15. A method for reading one or more selected words in a memory having a read pointer and a write pointer, comprising the steps of:

selecting a first location of said memory;

writing one or more words to a first latch after said selecting step;

precharging a wordline of said memory; and reading said one or more words from said first latch.

16. The method according to claim 15 further comprising the steps of:

writing of one or more words to a second latch at a time other than after said selecting step; and retransmitting information from said first location.

17. The method according to claim 16 further comprising the step of:

reading information from either said first or second latch in response to a retransmit signal.

18. The method according to claim 15 further comprising the step of:

limiting when said one or more words are written to said first latch.

19. The method according to claim 15 further comprising the step of:

generating a sequential order for writing to said first latch.

20. The method according to claim 15 further comprising the step of:

reading said one or more words during a precharge time of said memory array.

* * * * *